(12) United States Patent
Hoefling

(10) Patent No.: US 11,313,389 B2
(45) Date of Patent: Apr. 26, 2022

(54) DIRECTLY-CONTROLLED HYDRAULIC DIRECTIONAL VALVE

(71) Applicant: Robert Bosch GmbH, Stuttgart (DE)

(72) Inventor: Klaus Hoefling, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 523 days.

(21) Appl. No.: 16/432,486

(22) Filed: Jun. 5, 2019

(65) Prior Publication Data
US 2019/0376613 A1 Dec. 12, 2019

(30) Foreign Application Priority Data

Jun. 6, 2018 (DE) ...................... 10 2018 208 893.4

(51) Int. Cl.
*F15B 13/044* (2006.01)
*F15B 13/042* (2006.01)
(Continued)

(52) U.S. Cl.
CPC ........ *F15B 13/0442* (2013.01); *F15B 13/042* (2013.01); *F16K 31/0613* (2013.01);
(Continued)

(58) Field of Classification Search
CPC ........... F16K 31/0613; F16K 2200/302; F16K 11/07; F04B 53/125; F15B 13/0402;
(Continued)

(56) References Cited

U.S. PATENT DOCUMENTS 2,630,136 A * 3/1953 Treseder ............. F16K 31/0613
137/625.65
3,324,890 A * 6/1967 Whitmore ........... F16K 11/0716
137/625.69

(Continued)

FOREIGN PATENT DOCUMENTS

DE 44 17 204 A1 12/1994
DE 197 10 318 A1 9/1998

OTHER PUBLICATIONS

Parker Hannifin Manufacturing Germany GmbH & Co. KG, Product Bulletin, HY11-5715-687/DE and UK (MSG11-5715-687/DE and UK), Regelventil (DE)/Proportional Directional Control Valve (UK), copyright 2019, German and English language, 44 pages.

*Primary Examiner* — William M McCalister
(74) *Attorney, Agent, or Firm* — Maginot, Moore & Beck LLP

(57) ABSTRACT

A directly-controlled hydraulic directional valve includes a housing, control piston, first and second springs, double-stroke solenoid, spring plate, adjustment device, and electronics. The piston is longitudinally displaceable in a bore in the housing, either directly or via a control sleeve. The springs are positioned in a region of an end of the piston remote from the solenoid. One end of each spring is supported on the spring plate, which is clamped between the springs and the piston. The other end of the first spring is fixed to the housing, and the other end of the second spring is fixed to the adjustment device. The first spring exerts a force on the piston in a first direction, and the second spring (Continued)

exerts a force on the piston in a second opposite direction, so as to bias the piston into a preferred position. The solenoid is mounted on a side of the housing, and is operable to move the piston out from the preferred position in opposite directions proportional to an electric current from the electronics, such that the piston moves to the preferred position in response to each of non-actuation of the solenoid and a fault in the electronics. The adjustment device is operable to alter a position of the other end of the second spring to adjust the preferred position of the piston.

8 Claims, 2 Drawing Sheets

(51) Int. Cl.
  *F16K 31/06* (2006.01)
  *F15B 13/04* (2006.01)
  *F16K 11/07* (2006.01)
(52) U.S. Cl.
  CPC ... *F15B 13/0402* (2013.01); *F15B 2013/0409* (2013.01); *F15B 2211/3105* (2013.01); *F15B 2211/323* (2013.01); *F16K 11/07* (2013.01); *F16K 2200/302* (2021.08); *Y10T 137/8671* (2015.04)
(58) Field of Classification Search
  CPC .............. F15B 13/042; F15B 13/0442; F15B 2013/0409; F15B 2211/3105; F15B 2211/323; Y10T 137/8667–8671
  USPC ........................................ 137/625.25–625.69
  See application file for complete search history.

(56) References Cited

U.S. PATENT DOCUMENTS

| | | | | |
|---|---|---|---|---|
| 3,738,379 A * | 6/1973 | Wilke | F16K 11/0704 | 137/106 |
| 3,773,083 A * | 11/1973 | Hague | F15B 13/042 | 137/625.69 |
| 3,783,901 A * | 1/1974 | Schneider | F15B 13/0436 | 137/625.64 |
| 3,862,645 A * | 1/1975 | Bianchetta | E02F 9/2285 | 137/625.69 |
| 4,201,116 A * | 5/1980 | Martin | F15B 13/0402 | 137/625.64 |
| 4,313,468 A * | 2/1982 | Patel | F15B 13/0438 | 137/625.61 |
| 4,434,966 A * | 3/1984 | Zajac | F15B 13/0402 | 137/270 |
| 4,453,565 A * | 6/1984 | Neff | F15B 13/02 | 137/596 |
| 4,565,219 A * | 1/1986 | Kunogi | F15B 13/0402 | 137/624.18 |
| 4,605,197 A * | 8/1986 | Casey | F15B 13/0438 | 251/30.01 |
| 4,611,632 A * | 9/1986 | Kolchinsky | F15B 13/0402 | 137/625.65 |
| 4,741,365 A * | 5/1988 | Van Ornum | F15B 13/0402 | 137/625.65 |
| 4,821,774 A * | 4/1989 | Chorkey | F16K 31/0693 | 137/625.65 |
| 4,844,412 A * | 7/1989 | Kubozono | F16K 11/0704 | 251/297 |
| 5,317,953 A * | 6/1994 | Wentworth | F15B 13/0422 | 137/596 |
| 5,592,972 A * | 1/1997 | Niethammer | F15B 13/0402 | 137/625.65 |
| 5,697,401 A * | 12/1997 | Shinoda | F15B 13/0438 | 137/625.62 |
| 5,992,294 A * | 11/1999 | Seddon | F15B 13/0402 | 192/103 F |
| 6,206,038 B1 * | 3/2001 | Klein | B60T 8/5025 | 137/596.17 |
| 6,371,441 B1 * | 4/2002 | Mattes | F02M 45/083 | 251/129.08 |
| 7,320,337 B2 * | 1/2008 | Arnault | F16K 11/07 | 137/625.68 |
| 7,412,989 B2 * | 8/2008 | Segi | F16K 31/0613 | 137/625.64 |
| 7,472,669 B2 * | 1/2009 | Hedman | F01L 9/10 | 123/90.12 |
| 7,909,060 B2 * | 3/2011 | Yamamoto | G05D 16/2026 | 137/625.6 |
| 8,225,818 B1 * | 7/2012 | Stephens | F15B 13/0442 | 137/625.68 |
| 8,413,685 B2 * | 4/2013 | Okamoto | F16K 31/0634 | 137/625.69 |
| 8,434,518 B2 * | 5/2013 | Okamoto | F16K 31/0655 | 137/625.69 |
| 8,464,758 B2 * | 6/2013 | Breunig | F15B 13/0417 | 137/625.69 |
| 8,578,967 B2 * | 11/2013 | Vinski | F02C 7/232 | 137/625.48 |
| 9,004,105 B2 * | 4/2015 | Bruck | F16K 11/0716 | 137/625.69 |
| 2001/0037831 A1 * | 11/2001 | Venditti | F16K 31/0613 | 137/625.69 |
| 2005/0076959 A1 * | 4/2005 | Yamamoto | F16K 31/0624 | 137/596.17 |
| 2005/0224119 A1 * | 10/2005 | Okamoto | F16K 11/0712 | 137/625.69 |
| 2007/0023722 A1 * | 2/2007 | Oishi | F16K 31/0613 | 251/129.15 |
| 2009/0038697 A1 * | 2/2009 | Cho | F25B 41/20 | 137/625.48 |
| 2009/0057588 A1 * | 3/2009 | Reilly | F16K 27/048 | 251/129.15 |
| 2010/0218836 A1 * | 9/2010 | Toliusis | F16K 31/0613 | 137/625.64 |
| 2010/0301248 A1 * | 12/2010 | Yamamoto | F15B 13/0417 | 251/129.15 |
| 2011/0061749 A1 * | 3/2011 | Okamoto | F16K 31/0693 | 137/492.5 |
| 2011/0197977 A1 * | 8/2011 | Henderson | F23N 5/242 | 137/467.5 |
| 2016/0070272 A1 * | 3/2016 | Sugimoto | G05B 19/416 | 700/282 |
| 2018/0163889 A1 * | 6/2018 | Bruck | F15B 13/0442 | |
| 2019/0178265 A1 * | 6/2019 | Sakashita | F16K 31/061 | |

\* cited by examiner

DIRECTLY-CONTROLLED HYDRAULIC DIRECTIONAL VALVE

This application claims priority under 35 U.S.C. § 119 to patent application no. DE 10 2018 208 893.4, filed on Jun. 6, 2018 in Germany, the disclosure of which is incorporated herein by reference in its entirety.

The disclosure concerns a directly-controlled hydraulic directional valve with a control piston which is accommodated in a valve bore of a valve housing directly or via a control sleeve inserted into the valve housing such that it can be longitudinally displaced and in conjunction of a first spring, which exerts a force on the control piston acting in one direction of displacement, with a second spring, which exerts a force on the control piston acting in the opposite direction of displacement, can be adjusted into a preferred position, with a double-stroke solenoid which is mounted on one side of the valve housing and by which the control piston can be moved out of the preferred position in proportion to an electric current, wherein the two springs are arranged in the region of the end of the control piston remote from the double-stroke solenoid.

BACKGROUND

Such a directional valve is usually designed as a 4-way valve, has a pressure port, a tank port and two load ports, and often serves as a pilot valve for a main valve, whose control piston has a collar, which as an actuating piston separates two control chambers from each other. These are connected in fluid flow terms to the load ports of the pilot valve. A directional valve of the type described above is known, for example, from Bulletin HY11-5715-687/DE of Parker Hannifin Manufacturing Germany GmbH & Co. KG. The combination of such a pilot valve with a main valve is known, for example, from DE 197 10 318 A1 or DE 44 17 204.

With a directional valve of the type described, the control piston is intended to assume a preferred position if the double-stroke solenoid is presently not actuated arbitrarily or as a result of a fault in the electronics. The preferred position leads to a particular actuation of the main valve, which then assumes a safe position. In the directional valve known from Bulletin HY11-5715-687/DE, two helical compression springs, arranged coaxially with respect to one another, are supported at their one end on a first spring plate, which abuts against the control piston within a certain stroke travel of the control piston, and which the two helical compression springs seek to press against a stop fixed relative to the housing. The outer of the two helical compression springs is supported at its second end on a locking screw screwed into the housing, that is to say it is ultimately supported on the housing. The inner of the two helical compression springs is supported at its second end by way of a second spring plate on the control piston. If the double-stroke solenoid does not exert any force on the control piston, it thus assumes a position in which the first spring plate is located on the stop fixed relative to the housing, and the control piston is located on the spring plate. This position is the preferred position. If the control piston is moved in one direction out of the cited position by an actuation of the double-stroke solenoid, only the outer of the two helical compression springs is compressed more strongly. If the control piston is moved in the opposite direction out of the cited position by an actuation of the double-stroke solenoid, only the inner of the two helical compression springs is compressed more strongly.

SUMMARY

The object of the disclosure is to design a directional valve of the type described at the outset such that a preferred position can be easily set or altered.

This is achieved by the fact that on the one hand, both springs are supported at a first end on a spring plate which is clamped between them and held on the control piston over the entire stroke, and that on the other hand, the first spring is supported at its second end fixed relative to the housing, and the second spring is supported at its second end on an adjustment device, with the position of which the second end of the second spring can also be altered.

If, in the case of a directly-controlled hydraulic directional valve, no force is exerted on the control piston by the double-stroke solenoid, the control piston assumes a position in which the force exerted by the first spring on the control piston is equal to the force exerted by the second spring on the control piston. If the position of the second end of the second spring is then altered by manipulation of the adjustment device, the spring plate is displaced, as are therefore also the positions of the first ends of the two springs. A force equilibrium between the two springs is restored, with a greater or lesser preloading of the two springs depending on the direction in which the adjustment device is actuated. Here, the alteration in the position of the spring plate is less than the alteration in the position of the second end of the second spring. If the two springs are two identical springs, the alteration in the position of the spring plate is exactly half as large as the alteration in the position of the second end of the second spring.

The spring plate, on which the two springs are supported at their respective first end, is advantageously held by a screwed connection on the control piston.

The screwed connection is advantageously configured such that a threaded pin, which projects beyond the end of the control piston remote from the double-stroke solenoid, is screwed axially into the control piston and that the spring plate is pushed onto the threaded pin and is held in contact with the control piston by a lock nut screwed onto the threaded pin.

It is beneficial for the threaded pin to have means for preventing it from rotating with a tool when screwing on the lock nut. The spring plate can likewise have means for preventing it from rotating with a tool when screwing on the lock nut. When the lock nut is screwed on, the spring plate is last of all clamped more and more strongly between the control piston and the lock nut, so that as a result of friction forces the spring plate could be driven along by the lock nut, and the control piston could be driven along by the spring plate, in the direction of rotation. This could thus interfere with the already previously performed adjustment of the control piston with respect to the double-stroke solenoid and of a sensor for the position of the control piston, which sensor is advantageously available for position control of the control piston. This is prevented by holding the spring plate while screwing on the lock nut.

The threaded pin is advantageously part of an actuation rod which extends through a longitudinal bore of the control piston and which is mechanically connected to the magnetic armature of the double-stroke solenoid. This therefore means that the double-stroke solenoid is coupled to the control piston at the end of the latter remote from the double-stroke solenoid. Small misalignments between the guidance for the magnetic armature and the guidance for the control piston then only have at most a minor effect on the smooth running of the control piston.

BRIEF DESCRIPTION OF THE DRAWINGS

An example of embodiment of a directly-controlled hydraulic directional valve is shown in the drawings. The disclosure is now explained in more detail with the aid of the figures of these drawings.

Here.

DETAILED DESCRIPTION

Figure 1:
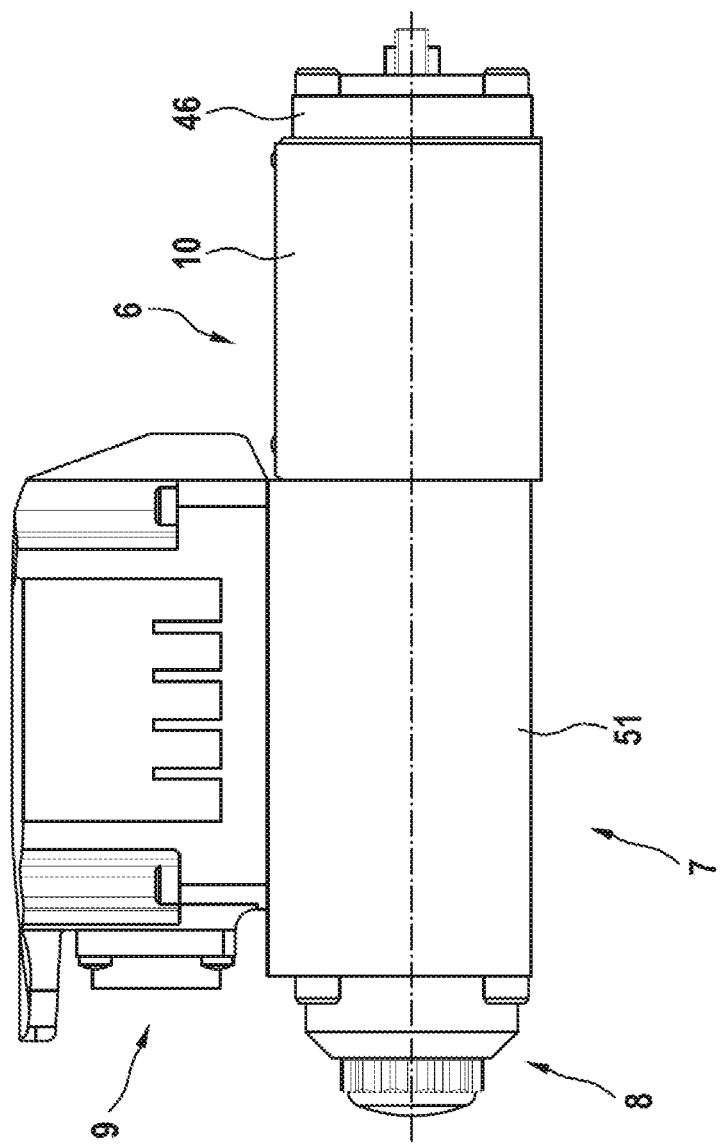
FIG. 1 shows the example of embodiment in one view.
Figure 2:
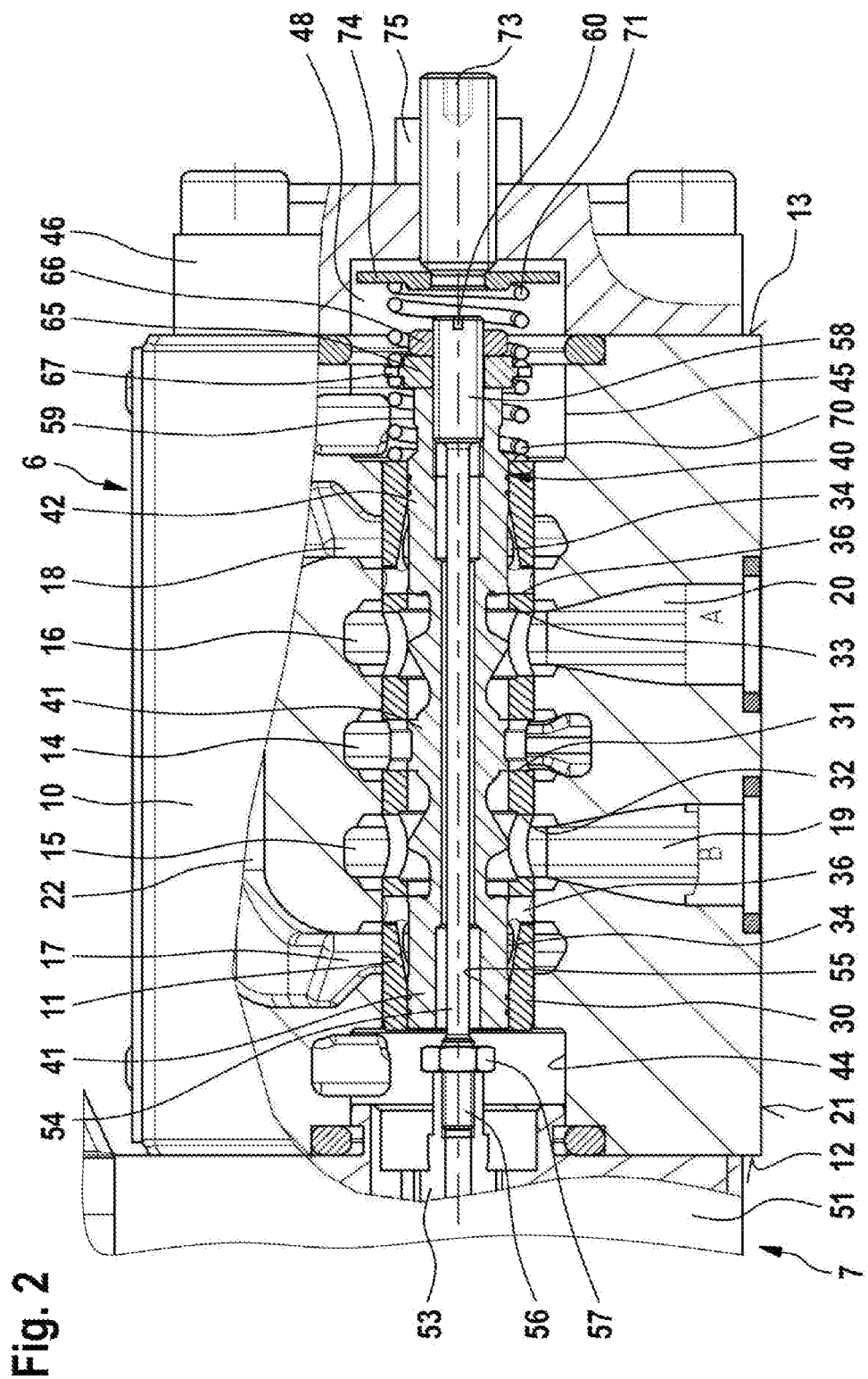
FIG. 2 shows the hydraulics section of the directional valve, partially in a longitudinal cross-section, on an enlarged scale compared to the view in FIG. 1.

The directly-controlled hydraulic directional valve shown comprises the following main components: a hydraulics section 6, a double-stroke solenoid 7, a displacement transducer 8, and an electronics section 9. The hydraulics section has a valve housing 10, in which a continuous valve bore 11 extends, which is open on two parallel side faces 12 and 13 of the valve housing. In the valve bore 11 there are arranged five fluid chambers, axially spaced apart from each other and enlarged with respect to the diameter of the valve bore, namely a central inlet chamber 14, a load chamber 15 on one side of the inlet chamber and a load chamber 16 on the other side of the inlet chamber, and two outer tank chambers 17 and 18. From the load chamber 16 a fluid channel 19 leads to a connecting port A, and from the load chamber 16 a fluid channel 20 leads to a connecting port B in a further side face 21 of the valve housing 10, which serves as a connecting face. The two tank chambers are connected to each other via a bridging channel 22, and (not shown in greater detail) via a fluid channel to a tank connecting port, which is also located in the side face 21. The inlet chamber 14 is also connected to an inlet connecting port in the side face 21.

A control sleeve 30 is inserted into the valve bore 11 such that it assumes a fixed position with respect to the valve housing 10. In the region of the fluid chambers 14 to 18, the control sleeve has openings in its wall, through which a pressurized medium can flow between the fluid chambers and the interior of the control sleeve 30. In the region of the inlet chamber 14 there are located a plurality of openings 31, which are designed such that they form two axially spaced apart control edges, fixed relative to the housing, on the inner wall of the control sleeve. In the region of the load chamber 15 there are located openings 32, and in the region of the load chamber 16 there are located openings 33, which, like the openings 32, are designed as radial bores. In the region of the tank chambers 17 and 18 there are located openings 34. These open at the inside into a conical recess 35, which in turn is broached by a plurality of openings 36 arranged radially and axially offset with respect to the openings 34, which openings 36 at their inner edge form a further axial control edge, which is fixed relative to the housing. The openings 36 are largely closed on the outside by a housing web. However, this is irrelevant, since the interior of the control sleeve 30 is open via the openings 34 outwards to a tank chamber 17, 18.

In the control sleeve 30, a control piston 40 is guided in its longitudinal movement. This has a central control collar 41 with two axially spaced apart control edges, which interact with the control edges, fixed relative to the housing, at the openings 31, wherein the axial distance between the two control edges on the control collar 41 is somewhat less than the distance between the control edges fixed relative to the housing. There is therefore a negative overlap between the control edges here.

The control piston 40 also has a further control collar 42, 43 spaced apart from the central control collar 41 on each side of the latter, on which a control edge is formed, which interacts with the control edge at the openings 36, and which, in addition, axially seals the interior of the control sleeve 30 from a section 44, 45 of the valve bore 11 which is located axially in front of the control sleeve 30 and which is open towards a side face 12, 13. A negative overlap also exists between the control edges on the control collars 42, 43 of the control piston 40 and the openings 36 such that, in a position of the control piston 40 in which its control collar 41 is axially located within the openings 31, a small flow cross-section to the openings 36 already exists on the control edges of the further control collars 42, 43. In the sections 44 and 45 the diameter of the valve bore 11 is larger than the outer diameter of the control sleeve 30. The sections 44 and 45 are connected in fluid flow terms to the bridging channel 22 and thus to the tank connecting port of the directional valve. On the side face 13 of the valve housing 10, the valve bore 11 is closed by a cover 46, on the inside of which, in alignment with the valve bore, there is a recess 47, by means of which a spring chamber 48 is formed together with the section 45 of the valve bore.

The double-stroke solenoid 7 is mounted on the side face 12 of the valve housing 10, in the housing 51 of which there is also the displacement transducer 8, with which the position of the control piston 40 is recorded, and which is used to control the position of the control piston 40. The double-stroke solenoid 7 has (not shown in any greater detail) two coils and a magnetic armature, which is firmly connected to the control piston 40 via an armature rod 53 fixedly inserted in the magnetic armature and an actuation rod 54 fixedly connected to the armature rod. Depending on the current applied to the two coils, the magnetic armature exerts a force on the control piston 40, which force can be varied in its strength, in one direction or in the opposite direction. The displacement sensor has a core, which is likewise fixedly connected to the magnetic armature.

The actuation rod 54 extends through a central longitudinal bore 55 of the control piston 40, beyond that and in end of the control piston 40 which is remote from the double-stroke solenoid 7, into the spring chamber 48. With a threaded section 56 at its one end, the actuation rod 54 is screwed into the armature rod 53. The screwed connection between the armature rod 53 and the actuation rod 54 is secured by a lock nut 57.

The actuation rod 54 is screwed into the control piston 40 with a threaded section 58 at the other end. The threaded section 58 can be regarded per se as a threaded pin. The coupling point between the magnetic armature and the control piston 40 is thus far removed from the magnetic armature, so that slight misalignments between the guidance of the magnetic armature and the guidance of the control piston have only at most a minor effect on the smooth running of the control piston. The control piston 40 is designed as an external hexagon 59 at its end projecting into the spring chamber 48. The actuation rod has a slot 60 at its end with the threaded section 58 for attaching a screwdriver. This allows one part to be held with a tool and the other part to be turned with a tool when screwing together the actuation rod 54 and the control piston 40.

The threaded section 58 of the actuation rod 54 projects beyond the control piston 40. A spring plate 65 is pushed over the threaded section 58 up to the end face of the control piston 40, and is clamped between a lock nut 66 screwed onto the threaded section 58 of the actuation rod 54 and the control piston 40, and is thus fixedly connected to the control piston 40. The lock nut 66 not only holds the spring plate 65 on the control piston 40, but also secures the screwed connection between the control piston 40 and the actuation rod 54. The spring plate 65 possesses cut-outs 67 on its edge, which can be used to hold it when screwing on the lock nut 66, so that the spring plate and with it the control piston 40 is rotated relative to the actuation rod 54.

A first spring 70, which is designed as a helical compression spring, is supported at its first end on the spring plate 65 and at its second end on the control sleeve 30, that is to say is fixed relative to the housing and thus exerts a force on the control piston 40 via the spring plate 65, which force is directed toward the cover 46. In addition to the first spring 70, there is a second spring 71 located in the spring chamber 48, which is also designed as a helical compression spring and is identical to the first spring 70, and is supported opposite the first spring 70 at its first end likewise on the spring plate 65 and at its second end on an adjustment device 72, which is arranged on the cover 46. The second spring 71 is thus clamped between the spring plate 65 and ultimately the cover 46, and exerts a force via the spring plate 65 onto the control piston 40, which force is directed away from the cover 46. If no other forces are applied to the control piston 40, it is always brought into a position by the two springs 70 and 71 in which the force exerted by the spring 70 is equal to the force exerted by the spring 71. This position is the preferred position.

The adjustment device 72 is present in order to be able to set the desired preferred position accurately and optionally one of possible different preferred positions, and comprises an adjustment screw 73 screwed into the cover 46 on the axis of the control piston 40, a spring plate 74 located within the spring chamber 48, and a lock nut 75, with which the position of the adjustment screw 73 is secured after an adjustment. The second spring 71 is supported at its second end on the spring plate 74 and holds the latter on the adjustment screw 73.

In the assembly of the directional valve, the actuation rod is first inserted through the control piston 40 and screwed onto the threaded section 58 with the control piston. The lock nut 57 is then screwed onto the threaded section 56 of the actuation rod 54. The threaded section 56 of the actuation rod 54 is screwed into the armature rod 53. This connection is then secured by tightening the lock nut 57. The control piston is inserted into the valve housing with the control sleeve 30, already fitted, and the double-stroke solenoid 7 including the displacement sensor 8 is attached to the valve housing 10. To set a hydraulic zero position of the control piston 40 on a hydraulic test bench, with a certain current applied to the double-stroke solenoid 7, even before the fitting of the cover 46 and before the fitting of the spring 70, the spring plate 65, and the lock nut 66, with a fixed actuation rod, the control piston 40 is rotated against the latter, and thus displaced axially, until the same pressure is applied in the two load chambers 15 and 16. The signal then emitted by the displacement transducer 8 is assigned to the zero position thus found.

The spring 70 and the spring plate 65 are then inserted and the lock nut 66 is screwed on. Finally the spring 71, the spring plate 74 and the cover 46 are assembled. The desired preferred position is now set by rotation of the adjustment screw 73. Once a preferred position has been set, it can be easily altered with the aid of the adjustment device 72.

LIST OF REFERENCE SYMBOLS

6 Hydraulics section
7 Double-stroke solenoid
8 Displacement transducer
9 Electronics section
10 Valve housing
11 Valve bore in 10
12 Side face of 10
13 Side face
14 Inlet chamber
15 Load chamber
16 Load chamber
17 Tank chamber
18 Tank chamber
19 Fluid channel
20 Fluid channel
21 Side face of 10
22 Bridging channel
30 Control sleeve
31 Openings in 30
32 Openings in 30
33 Openings in 30
34 Openings in 30
35 Conical recess in 30
36 Openings in 30
40 Control piston
41 Control collar on 40
42 Control collar on 40
43 Control collar on 40
44 Section of 11
45 Section of 11
46 Cover
47 Recess in 46
48 Spring chamber
51 Housing of 7
53 Armature rod
54 Actuation rod
55 Longitudinal bore in 40
56 Threaded section on 54
57 Lock nut
58 Threaded section on 54
60 Slot in 58
65 Spring plate
66 Lock nut
67 Cut-outs in 65
70 First spring
71 Second spring
72 Adjustment device
73 Adjustment screw
74 Spring plate
75 Lock nut
A Connecting port
B Connecting port

What is claimed is:

1. A directly controlled hydraulic directional valve, comprising:
   a valve housing that includes a valve bore;
   a control piston positioned in the valve bore either directly or via a control sleeve, such that the control piston is longitudinally displaceable in the valve bore;
   a double-stroke solenoid mounted on a side of the housing;
   a spring plate;

a first spring that is positioned in a region of an end of the control piston remote from the double-stroke solenoid, that exerts a first force on the control piston in a first displacement direction, and that includes:
  a first end supported on the spring plate so as to clamp the spring plate between the first end of the first spring and the control piston over an entire stroke of the control piston; and
  a second end that is fixed relative to the housing;
an adjustment device; and
a second spring that is positioned in the region of the end of the control piston remote from the double-stroke solenoid, that exerts a second force on the control piston in a second displacement direction opposite to the first displacement direction such that the control piston is biased into a preferred position via the first force and second force, and that includes:
  a first end supported on the spring plate so as to clamp the spring plate between the first end of the second spring and the control piston over the entire stroke of the control piston; and
  a second end supported by the adjustment device, such that the adjustment device is operable to adjust a position of the second end of the second spring;
wherein the double-stroke solenoid is configured to move the control piston out from the preferred position in response to an electric parameter.

2. The directly-controlled hydraulic directional valve of claim 1, wherein the first spring is identical to the second spring.

3. The directly-controlled hydraulic directional valve of claim 1, wherein the spring plate is held on the control piston via a screw connection.

4. The directly-controlled hydraulic directional valve of claim 2, further comprising:
  a threaded pin that is screwed axially into the end of the control piston remote from the double-stroke solenoid such that the threaded pin projects beyond the end of the control piston, wherein the spring plate is mounted on the threaded pin; and
  a lock nut that is screwed onto the threaded pin so as to hold the spring plate in contact with the control piston.

5. The directly-controlled hydraulic directional valve of claim 4, wherein the threaded pin includes a member configured to prevent the threaded pin from rotating with a tool as the lock nut is screwed onto the threaded pin.

6. The directly-controlled hydraulic directional valve of claim 4, wherein the spring plate includes a member configured to prevent the spring plate from rotating with a tool as the lock nut is screwed onto the threaded pin.

7. The directly-controlled hydraulic directional valve of claim 4, wherein:
  the control piston further includes a longitudinal bore;
  the threaded pin forms a portion of an actuation rod that extends through the longitudinal bore; and
  the double-stroke solenoid includes a magnetic armature that is mechanically connected to the actuation rod.

8. The directly-controlled hydraulic directional valve of claim 1, further comprising:
  a displacement sensor for position control of the control piston.

* * * * *